United States Patent
Jang et al.

(10) Patent No.: US 9,207,825 B2
(45) Date of Patent: Dec. 8, 2015

(54) DISPLAY DEVICE, TOUCH PANEL DEVICE, TOUCH PANEL DRIVING IC DEVICE, AND METHOD OF DRIVING TOUCH PANEL

(71) Applicant: Samsung Display Co., Ltd., Yongin (KR)

(72) Inventors: Hyoung Wook Jang, Anyang-si (KR); Soon Sung Ahn, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 77 days.

(21) Appl. No.: 14/242,513

(22) Filed: Apr. 1, 2014

(65) Prior Publication Data

US 2015/0123933 A1    May 7, 2015

(30) Foreign Application Priority Data

Nov. 5, 2013   (KR) .......................... 10-2013-0133658

(51) Int. Cl.
   *G06F 3/044*   (2006.01)
   *G06F 3/041*   (2006.01)

(52) U.S. Cl.
   CPC .............. *G06F 3/044* (2013.01); *G06F 3/0412* (2013.01); *G06F 3/0416* (2013.01)

(58) Field of Classification Search
   CPC ......... G06F 3/041; G06F 3/042; G06F 3/043; G06F 3/044
   See application file for complete search history.

(56) References Cited

U.S. PATENT DOCUMENTS

| 8,132,313 | B2 | 3/2012 | Shiau et al. | |
|---|---|---|---|---|
| 8,421,773 | B2 | 4/2013 | Li et al. | |
| 8,692,563 | B1* | 4/2014 | Maharyta | 324/658 |
| 8,970,545 | B2* | 3/2015 | Reynolds et al. | 345/174 |
| 2011/0156839 | A1* | 6/2011 | Martin et al. | 333/172 |
| 2012/0105350 | A1* | 5/2012 | Lee et al. | 345/173 |
| 2013/0001604 | A1 | 1/2013 | Shimonishi et al. | |
| 2013/0016047 | A1 | 1/2013 | Masumoto | |
| 2013/0207911 | A1 | 8/2013 | Barton et al. | |
| 2013/0257794 | A1* | 10/2013 | Lee et al. | 345/174 |
| 2014/0009442 | A1* | 1/2014 | Kim | 345/174 |

FOREIGN PATENT DOCUMENTS

| JP | 5213985 | 3/2013 |
|---|---|---|
| KR | 10-2011-0064181 | 6/2011 |
| KR | 10-1084169 | 11/2011 |
| KR | 10-1103288 | 1/2012 |
| KR | 10-1165456 | 7/2012 |
| KR | 10-2013-0071999 | 7/2013 |

* cited by examiner

*Primary Examiner* — Kevin M Nguyen
(74) *Attorney, Agent, or Firm* — H.C. Park & Associates, PLC

(57) ABSTRACT

A display device, including an upper substrate, a plurality of sense wires disposed on the upper substrate, a plurality of sense pads disposed on the upper substrate, a plurality of first connection units disposed on the upper substrate, a lower substrate, a display unit including a plurality of display elements, disposed on the lower substrate, multiplexer units disposed on the lower substrate, a touch panel driver integrated circuit connected to the multiplexer units, and conductive members electrically connecting the plurality of first connection units and the plurality of second connection units, respectively, wherein each of the plurality of sense wires is connected with each of the plurality of sense pads, and one end of each of the plurality of sense wires is connected to each of the plurality of first connection units, respectively, and the multiplexer units each include a plurality of second connection units.

20 Claims, 9 Drawing Sheets

DISPLAY DEVICE, TOUCH PANEL DEVICE, TOUCH PANEL DRIVING IC DEVICE, AND METHOD OF DRIVING TOUCH PANEL

CROSS-REFERENCE TO RELATED APPLICATION

This application claims priority from and the benefit of Korean Patent Application No. 10-2013-0133658 filed on Nov. 5, 2013, which is hereby incorporated by reference for all purposes as if fully set forth herein.

BACKGROUND

1. Field

Exemplary embodiments of the present invention relate to a display device, a touch panel device, a touch panel driver IC device, and a touch panel driving method. More particularly, exemplary embodiments of the present invention relate to a display device including a capacitive type of touch panel function, a touch panel device, a touch panel driver IC device, and a touch panel driving method.

2. Discussion of the Background

A touch panel is an input device that recognizes a touch location of a user and inputs a user's command. The touch panel is provided in a front surface of the display device to determine an input signal by recognizing a location where a hand of the user or an object touches. The touch panel includes a resistive touch panel, a capacitive touch panel, an infrared touch panel, and an ultrasonic touch panel. In general, the resistive touch panel and the capacitive touch panel are used.

In particular, the capacitive touch panel is preferred in a structure in which micro-electrode patterns are formed and of which the thickness is required to be reduced. The capacitive touch panel detects a touch location by sensing variation of capacitance between electrodes when a finger of a user touches.

In order to apply a touch function to the display device, a touch panel is additionally attached to the display device. However, when the touch panel is additionally attached to the display device, the overall thickness of the display device is increased.

In addition, the number of wires of the touch panel is exponentially increased as the size of the display device is increased, and there is a limit in arranging the increasing number of wires in a limited space.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention have been made in an effort to provide a display device, a touch panel device, a touch panel driver IC device, and a touch panel driving method that can have a touch panel function without additional attachment of a touch panel and solve a problem of an increase of a number of wires required for a touch function in accordance with a size increase of the display device.

Additional features of the invention will be set forth in the description which follows, and in part will be apparent from the description, or may be learned by practice of the invention.

An exemplary embodiment of the present invention discloses a display device, including an upper substrate, a plurality of sense wires disposed on the upper substrate, a plurality of sense pads disposed on the upper substrate, a plurality of first connection units disposed on the upper substrate, a lower substrate, a display unit including a plurality of display elements, disposed on the lower substrate, multiplexer (MUX) units disposed on the lower substrate, a touch panel driver integrated circuit (IC) connected to the MUX units, and conductive members electrically connecting the plurality of first connection units and the plurality of second connection units, respectively, wherein each of the plurality of sense wires is connected with each of the plurality of sense pads, and one end of each of the plurality of sense wires is connected to each of the plurality of first connection units, respectively, and the MUX units each include a plurality of second connection units.

An exemplary embodiment of the present embodiment discloses a touch panel device, including an upper substrate, a plurality of sense wires disposed on the upper substrate, a plurality of sense pads disposed on the upper substrate, a plurality of first connection units disposed on the upper substrate, a lower substrate, multiplexer (MUX) units disposed on the lower substrate, a touch panel driver integrated circuit (IC) connected to the MUX units, and conductive members electrically connecting the plurality of first connection units and the plurality of second connection units, wherein each of the plurality of sense wires is connected to each of the plurality of sense pads, and one end of each of the plurality of sense wires is connected to each of the plurality of first connection units, respectively, and the MUX units each include a plurality of second connection units.

An exemplary embodiment of the present invention discloses a method for driving a touch panel, including, transmitting a sense control signal to a multiplexer (MUX) unit including a plurality of second connection units connected with a plurality of first connection units through conductive members, connecting one of the plurality of second connection units to a sense driving wire connected to the MUX unit according to the sense control signal, and detecting a touch location by measuring capacitance of a sense pad transmitted through the sense driving wire, wherein the plurality of first connection units is connected to ends of a plurality of sense wires and the plurality of sense wires is connected to a plurality of sense pads.

An exemplary embodiment of the present invention also discloses a touch panel driver integrated circuit (IC) device, configured to detect a touch location, transmit a sense control signal to multiplexer (MUX) units including a plurality of second connection units connected to a plurality of sense pads, and configured to detect a touch location by measuring capacitance of a sense pad transmitted, when one of the plurality of second connection units is connected to the MUX units.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
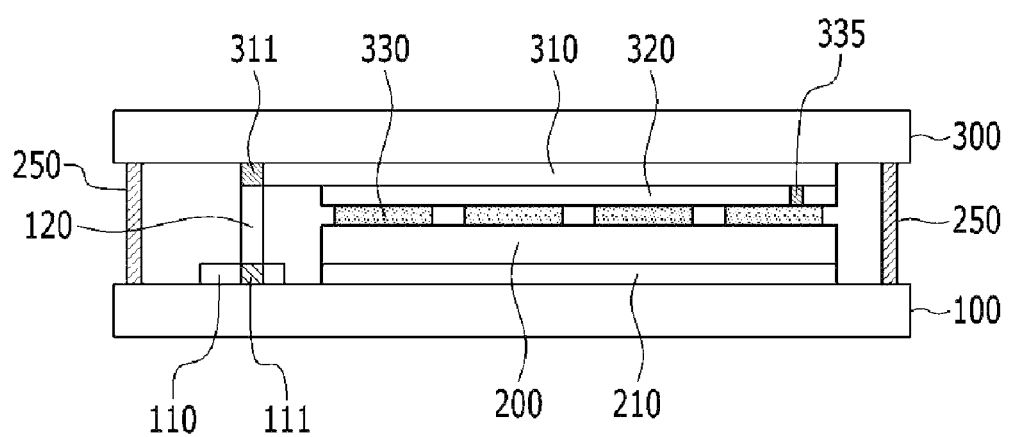
FIG. 1 is a schematic cross-sectional view of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only configurations different from the first exemplary embodiment will be described.

The drawings and description are to be regarded as illustrative in nature and not restrictive, and like reference numerals designate like elements throughout the specification.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that when an element such as a layer, film, region, or substrate is referred to as being "on" another element, it can be directly on the other element or intervening elements may also be present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
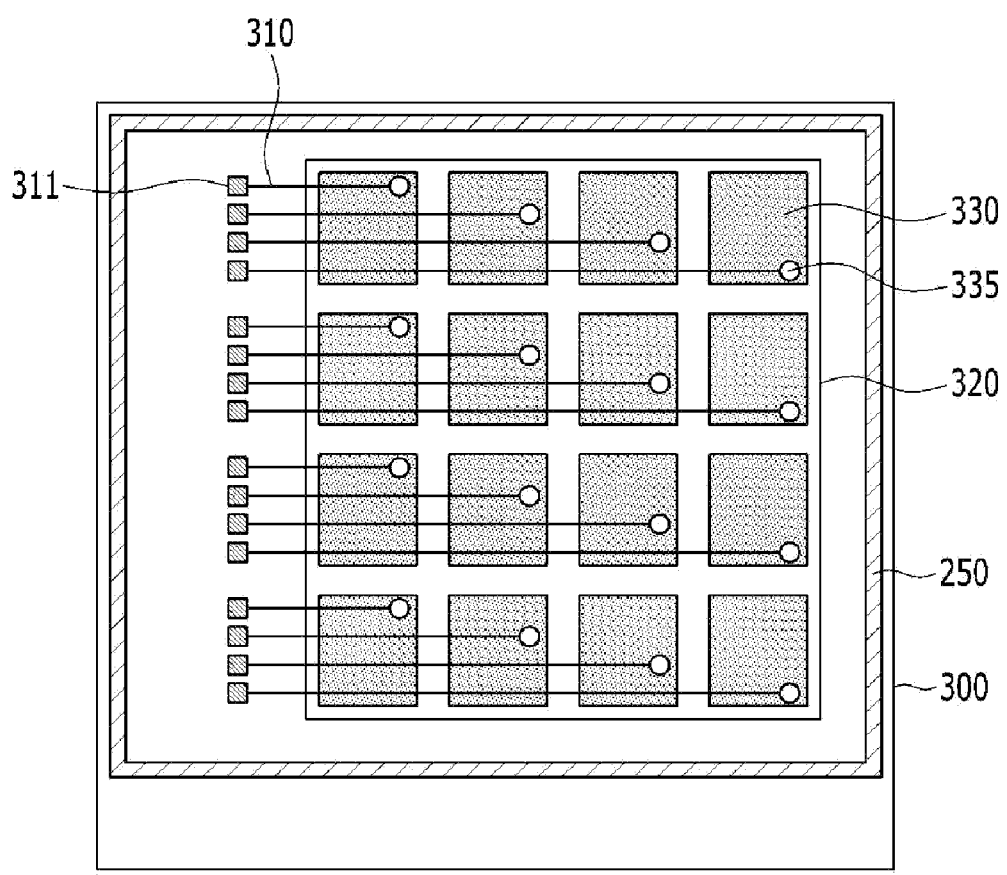
FIG. 2 is a top plan view illustrating one side of an upper substrate of the display device according to the exemplary embodiment of the present invention illustrated in FIG. 1.
Figure 3:
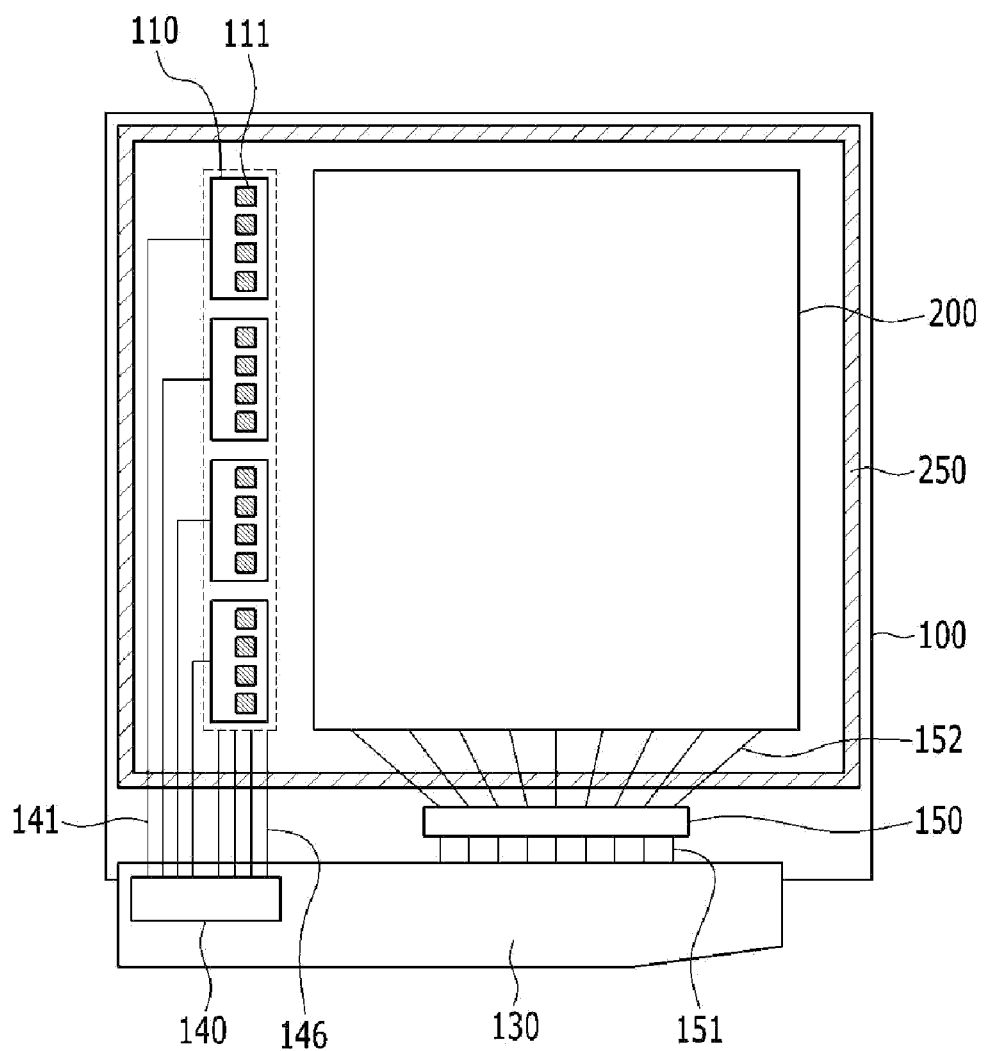
FIG. 3 is a top plan view illustrating one side of a lower substrate of the display device according to the exemplary embodiment of the present invention illustrated in FIG. 1.

FIG. 1 is a schematic cross-sectional view of a display device according to an exemplary embodiment of the present invention. FIG. 2 is a top plan view illustrating one side of an upper substrate of the display device according to the exemplary embodiment of the present invention illustrated in FIG. 1. FIG. 3 is a top plan view illustrating one side of a lower substrate of the display device according to the exemplary embodiment of the present invention illustrated in FIG. 1.

Referring to FIG. 1, FIG. 2, and FIG. 3, the display device includes a lower substrate 100 on which a display unit 200 and at least one MUX unit 110 are disposed, and an upper substrate 300 on which a plurality of sense pads 330 are disposed.

The lower substrate 100 and the upper substrate 300 may be formed of a transparent glass or plastic material made with $SiO_2$ as a main component. The plastic material that forms the lower substrate 100 and the upper substrate 300 include polyether sulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), and cellulose acetate propionate (CAP).

First, a layout of the upper substrate 300 will be described.

A plurality of sense wires 310 are disposed on the upper substrate 300, a plurality of sense pads 330 are disposed on the plurality of sense wires 310, and an insulation layer 320 is disposed between the plurality of sense pads 330 and the plurality of sense wires 310. Each of the plurality of sense pads 330 are electrically connected to each of the plurality of sense wires 310 through contact holes 335.

The plurality of sense pads 330 may be arranged in a matrix format. That is, the plurality of sense pads 330 may be arranged in a first direction and a second direction that is perpendicular to the first direction. The plurality of sense pads 330 may be formed in the shape of a quadrangle. While the exemplary embodiment illustrates that the sense pads 330 are formed in the quadrangle shape, the plurality of sense pads 330 may be formed in various shapes, such as, for example, a triangle, a hexagon, a polygon, and the like.

The plurality of sense pads 330 may be formed of a metal mesh. The metal mesh may be formed by finely patterning a metallic material. The metal mesh may be formed by using a printing method, an imprinting method, a lithography method, and the like. The printing method is a method of directly forming a transparent electrode (or wire) with a transparent conductive material (or a metallic material) on a substrate using a gravure or offset method. The imprinting method is a method of forming a transparent electrode (or a wire) by forming a fine pattern on a transparent conductive film or a metal film and then forming a transparent electrode (or wire) by etching the transparent conductive film (or wire) through the fine pattern. The lithography method is a method where the fine pattern is formed on the substrate through a source such as light, a laser, or an electronic beam, and the transparent conductive layer (or metal layer) is etched by using the fine pattern to form the transparent electrode (or wire). A metal pattern forming the metal mesh may have a line width of about 0.1 μm to about 10 μm formed with a metallic material such as copper (Cu), aluminum (Al), molybdenum (Mo), silver (Ag), and the like. The plurality of sense pads 330 formed of the metal mesh may have high conductivity and high transparency.

The plurality of sense pads 330 may also be made of a transparent electrically conductive material such as indium tin oxide (ITO), indium zinc oxide (IZO), and the like.

The plurality of sense wires 310 are extended in the first direction on the upper substrate 300. The number of sense wires 310 may be equivalent to the number of sense pads 330. For example, a sense pad group may include n sense pads 330 arranged in the first direction, and n sense wires 310 may be formed below the n sense pads 330. When m sense pad groups, each sense pad groups including the n sense pads 330 arranged in the first direction, are arranged in the second direction, n×m sense wires 310 may be formed. Each end of the n×m sense wires 310 may be connected to corresponding first connection portion 311 arranged on the upper substrate 330. That is, n×m first connection portions 311 may be provided on the upper substrate 330.

The plurality of sense wires 310 may be made of a metallic material. The metallic material may include silver (Ag), gold (Au), tungsten (Pt), copper (Cu), molybdenum (Mo), aluminum (Al), and the like. The metallic material used as the plurality of sense wires 310 may be processed with an anti-reflection treatment and not reflect light incident from an upper portion. The width of each sense wire of the plurality of sense wires 310 is about 10 μm to 20 μm, and a gap between the sense wires 310 may be about hundreds of micrometers. The anti-reflection treated sense wires 310 are difficult to be seen by a user, and a luminance rate of the display device may hardly be influenced.

The plurality of sense wires 310 may also be made of a transparent electrically conductive material such as indium tin oxide (ITO), indium zinc oxide (IZO), and the like.

The insulating layer 320 is disposed on the plurality of sense wires 310 and electrically insulates the plurality of sense wires 310 from the outside. The insulating layer 320 may be made of an inorganic insulating material such as a silicon nitride ($SiN_x$), a silicon oxide ($SiO_x$), and the like. Alternatively, the insulating layer 320 may be made of an organic insulating material. In some cases, the insulating layer 320 may include both inorganic insulating material and organic insulating material.

The plurality of contact holes 335 is formed in the insulating layer 320 corresponding to the plurality of sense pads 330. The plurality of contact holes 335 may be formed through a photolithography process. Each of the plurality of contact holes 335 is formed at a location corresponding to each of the plurality of sense wires 310, and the plurality of sense wires 310 are exposed by the contact holes 335. Each of the plurality of contact holes 335 is formed corresponding to each of the plurality of sense wires 310, and a single sense pad 330 is formed corresponding to a single contact hole 335.

The plurality of sense pads 330 is formed on the insulating layer 320 where the plurality of contact holes 335 is formed. While the plurality of sense pads 330 is being formed, a metallic material fills the plurality of contact holes 335 and each of the plurality of sense pads 330 may be electrically connected with the corresponding sense wires 310 through the contact hole 335.

Next, a layout of the lower substrate 100 will be described.

The display unit 200 is disposed on the lower substrate 100, and at least one MUX unit 110 is provided at one side of the lower substrate 100 separate from the display unit 200. A buffer layer 210 may be provided between the lower substrate 100 and the display unit 200 to planarize the lower substrate 100 and to prevent permeation of impurities.

The display unit 200 may include a plurality of display elements. The plurality of display elements may be at least one of an organic light emitting diode (OLED) display, a liquid crystal display (LCD), a field emission display (FED), and a plasma display panel (PDP). The display unit 200 displays an image using the plurality of display elements. The display unit 200 may be formed corresponding to the size of a display area of the display device.

A printed circuit board (PCB) 130 configured to include various electric parts provided for driving and control of the display unit 200 may be provided at one side of the display unit 200. A display driver IC (DDI) 150 for driving the display unit 200 may be provided between the printed circuit board PCB 130 and the display unit 200. The display driver IC 150 and the printed circuit board 130 may be connected through input and output wires 151. The display driver IC 150 may be connected to the display unit 200 through data lines 152.

A touch panel driver IC (TDI) 140 is provided in the printed circuit board 130 to drive and control the plurality of sense pads 330. The touch panel driver IC 140 is connected with a plurality of sense driving wires 141 and a plurality of sense control wires 146. Although the exemplary embodiment illustrates that the touch panel driver IC 140 is provided in the printed circuit board 130, the present invention is not limited thereto. The touch panel driver IC 140 may be provided on the lower substrate 100 or included in the display driver IC 150 as necessary, and any other viable embodiment.

Each MUX unit 110 includes a plurality of second connection units 111. The MUX units 110 are connected to a sense driving wire 141 and a sense control wire 146, and are connected to the touch panel driver IC 140 through the sense driving wire 141 and the sense control wire 146. A number of MUX units 110 may be equivalent to the number of the sense pad groups, and a number of second connection units 111 included in each MUX unit 100 may be equivalent to the number of sense pads 330 included in the corresponding sense pad group. For example, when a sense pad group including n sense pads 330 arranged in the first direction is arranged m times in the second direction, m MUX units 110 may be provided and each MUX unit 110 may include n second connection units 111. In other words, a total of n×m second connection units 111 may be arranged on the lower substrate 100.

Hereinafter, a connection relationship between the upper substrate 300 and the lower substrate 100 will be described.

The upper substrate 300 and the lower substrate 100 are attached to each other, wherein one side of the upper substrate 300 where the plurality of sense pads 330 are disposed and one side of the lower substrate 100 where the display unit 200 may be disposed face each other. In this case, a sealant 250 may be used to attach the upper substrate 300 and the lower substrate 100 to each other. As the sealant 250, an organic sealant, an inorganic sealant, and an organic/inorganic complex sealant or a mixture thereof may be used.

The first connection units 311 disposed on the upper substrate 300 may be electrically connected to the corresponding plurality of second connection units 111 disposed on the lower substrate 100. For example, each of the n×m first connection units 311 disposed on the upper substrate 330 is connected to each of the n×m second connection units 111 disposed on the lower substrate 100. The plurality of first connection units 311 and the plurality of second connection units 111 may be electrically connected with each other by a conductive member 120. The conductive member 120 may include various conductive materials such as a silver paste, an anisotropic conductive film (ACF), and the like. As the plurality of first connection units 311 and the plurality of second connection units 111 are electrically connected through the conductive member 120, the plurality of sense wires 310 may be electrically connected to the touch driver IC 140.

The touch panel driver IC 140 transmits a sense control signal to the MUX unit 110 through the sense control wire 146, and the MUX unit 110 connects one of the plurality of second connection units 111 to the sense driving wire 141 according to the sense control signal. The second connection unit 111 connected to the sense driving wire 141 is in turn connected to the first connection unit 311 through the conductive member 120, and the corresponding first connection unit 311 is connected to the sense wire 310.

A default capacitance may be formed in the sense pad 330 connected to the sense wire 310, and the capacitance of the sense pad 330 may be changed when a contact occurs thereto by a finger and the like. When the sense driving wire 141 and the second connection unit 111 are connected by the MUX unit 110, the changed capacitance of the sense pad 330 is transmitted to the touch panel driver IC 140 through the sense wire 310, the first connection unit 311, the conductive member 120, the second connection unit 111, and the sense drive wire 141. The touch panel driver IC 140 detects a touch location by checking the sense wire 310 to which the changed capacitance was transmitted.

An exemplary method of detecting the touch location with respect to the entire area of the plurality of sense pads 330 by the touch panel driver IC 140 will be described hereinafter. When m MUX units 110 each include n second connection units 111, the touch panel driver IC 140 may sequentially transmit the sense control signal to the m MUX units 110, and each MUX unit 110 may sequentially connect the n second connection units 111 to the sense driving wires 141. The touch panel driver IC 140 measures each capacitance of the sense pad 330 transmitted when the second connection units 111 are sequentially connected to the sense driving wire 141, and detects the touch location.

Another exemplary method in which the touch panel driver IC 140 detects a touch location of all the sense pads 330 will now be described. When m MUX units 110 each include n second connection units 111, the touch panel driver IC 140 sequentially transmits n sense control signals to the m MUX units 110, where each sense control signal includes m sense control signals each to be simultaneously sent to corresponding MUX unit 110, respectively, and each MUX units 110 sequentially connect the n second connection units 111 simultaneously to the sense driving wires 141 respectively corresponding to n sense control signals. The touch panel driver IC 140 measures m capacitances of the sense pads 330 each transmitted from corresponding MUX unit 110, when the second connection units 111 are sequentially connected to the sense driving wire 141, and detects the touch location corresponding to the sense control signal.

As described above, the number of sense driving wires 141 connected to the touch panel driver IC 140 can be reduced by using the MUX units 110. Particularly, as the size of the display device is increased, the number of sense wires 310 is exponentially increased. In such case, all the sense wires 310 may not be directly connected to the touch panel driver IC 140 with ease. According to the exemplary embodiment proposed above, even when the size of the display device is increased, all the sense wires 310 can be connected to the touch panel driver IC 140 by using the MUX units 110.

In addition, the MUX units 110 are disposed in the lower substrate 100 where the display unit 200 is disposed such that the MUX units 110 can be formed together using a process for forming the display unit 200, and accordingly, an additional manufacturing process for forming the MUX units 100 can be omitted.

Further, the plurality of sense pads 330 are provided between the lower substrate 100 and the upper substrate 300 of the display device rather than attaching additional touch panel to the display device, and therefore a function of the touch panel can be realized without an increase of the thickness of the display device.

Figure 4:
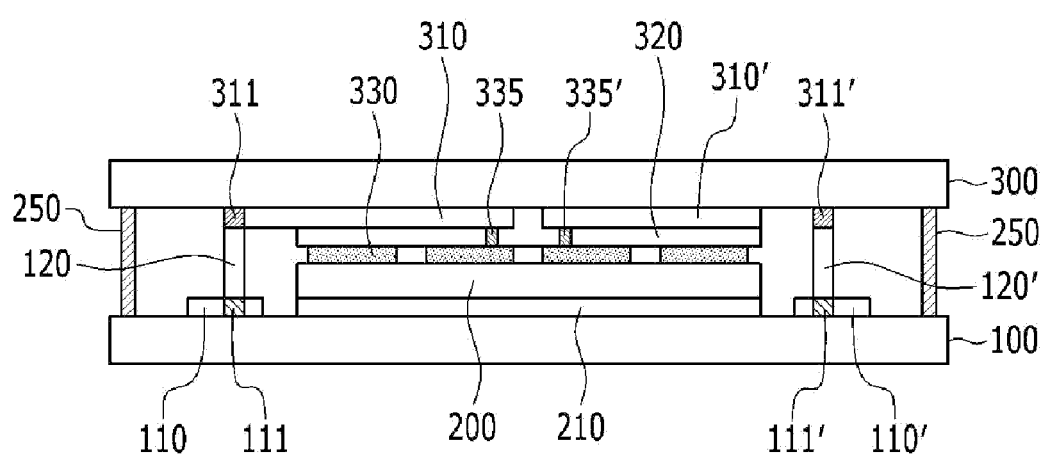
FIG. 4 is a schematic cross-sectional view of a display device according to an exemplary embodiment of the present invention.
Figure 5:
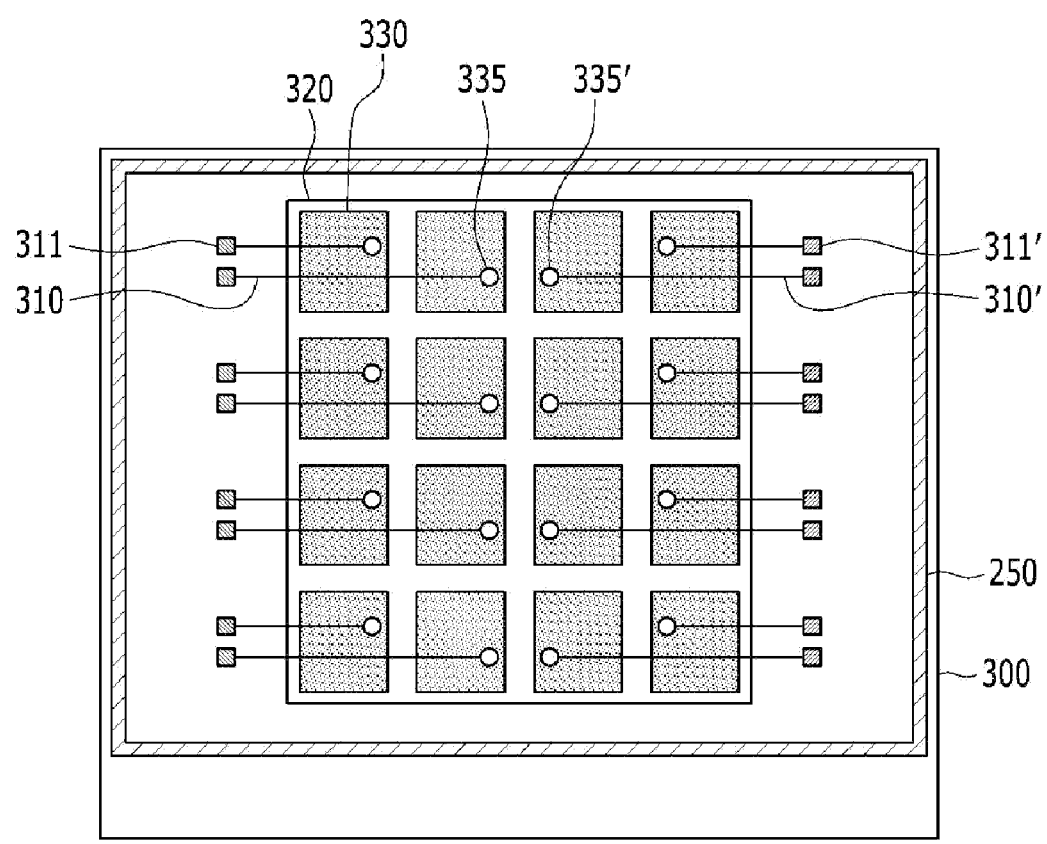
FIG. 5 is a top plan view illustrating one side of an upper substrate of the display device according to the other exemplary embodiment of the present invention illustrated in FIG. 4.
Figure 6:
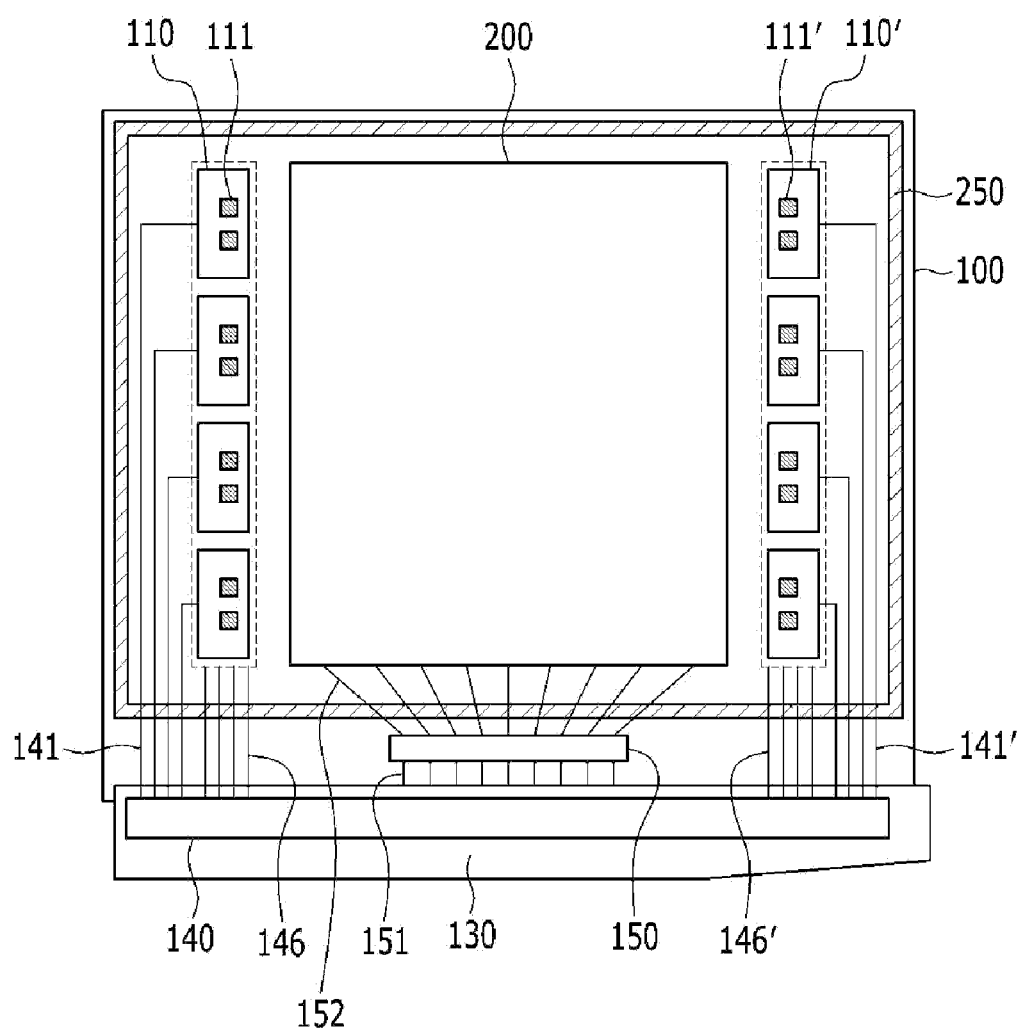
FIG. 6 is a top plan view illustrating one side of a lower substrate of the display device according to the other exemplary embodiment of the present invention illustrated in FIG. 4.

FIG. 4 is a schematic cross-sectional view of a display device according to another exemplary embodiment of the present invention. FIG. 5 is a top plan view illustrating one side of the upper substrate of the display device according to the other exemplary embodiment of the present invention illustrated in FIG. 4. FIG. 6 is a top plan view illustrating one side of a lower substrate of the display device according to the other exemplary embodiment of the present invention illustrated in FIG. 4.

Referring to FIG. 4, FIG. 5, and FIG. 6, a display device includes a lower substrate 100 on which a display unit 200 and at least one of MUX units 110 and 110' are disposed and an upper substrate 300 on which a plurality of sense pads 330 are disposed. The lower substrate 100 and the upper substrate 300 may be formed of similar materials to the exemplary embodiment illustrated in FIG. 1.

First, a layout of the upper substrate 300 will be described.

A plurality of sense pads 310 and 310' are disposed on the upper substrate 300, a plurality of sense pads 330 are disposed on the plurality of sense wires 310 and 310', and an insulation layer 320 is disposed between the plurality of sense pads 330 and the plurality of sense wires 310 and 310'. The respective sense pads 330 are electrically connected to the respective sense wires 310 and 310' through contact holes 335 and 335'.

The plurality of sense pads 330 may be arranged in a matrix format. That is, the plurality of sense pads 330 may be arranged in a first direction and a second direction that is perpendicular to the first direction. The sense pads 330 may be arranged in a similar fashion illustrated in the exemplary embodiment of FIG. 1.

The plurality of sense pads 330 may be made of a metal mesh. The metal mesh may be formed by finely patterning a high-conductive metal, using similar method illustrated in the exemplary embodiment of FIG. 1. The plurality of sense pads 330 may also be made of a transparent electrically conductive material such as indium tin oxide (ITO), indium zinc oxide (IZO), and the like.

A plurality of sense wires 310 are extended from corresponding first connection portions 311 in the first direction on the upper substrate 300, and a plurality of sense wires 310' are extended from the corresponding first connection portion 311' in the opposite direction of the first direction. The plurality of sense wires 310 and 310' may be provided corresponding to the same number of the plurality of sense pads 330. For example, a sense pad group may include n sense pads 330 arranged in the first direction, and n/2 sense wires 310 may be formed under n/2 sense pads 330 and n/2 sense wires 310' may be formed under n/2 sense pads 330. When m sense pad groups, each sense pad groups including n sense pads 330 arranged in the first direction, are arranged in the second direction, n×m sense wires 310 and 310' may be formed. Each end of the n×m sense wires 310 and 310' may be connected to corresponding first connection portions 311 and 311' arranged on the upper substrate 330. That is, n×m first connection portions 311 and 311' may be provided on the upper substrate 330. The plurality of sense wires 310 may be made of similar materials to the exemplary embodiment illustrated in FIG. 1.

Compared to FIG. 2, the first connection units 311 and 311' are arranged at respective sides of the upper substrate 300, so that the length and resistance of the plurality of sense wires 310 and 310' can be reduced.

The insulating layer 320 is disposed on the plurality of sense wires 310 and 310' for electrical insulation of the plurality of sense wires 310 and 310' from the outside. The insulating layer 320 may be made of similar materials to the exemplary embodiment illustrated in FIG. 1.

The plurality of contact holes 335 and 335' respectively corresponding to the plurality of sense pads 330 are formed in the insulating layer 320. Each of the plurality of contact holes 335 and 335' may be formed at a location corresponding to each of the plurality of sense wires 310 and 310', and the plurality of sense wires 310 and 310' are exposed by the contact holes 335 and 335'. Each of the plurality of sense wires 310 and 310' corresponds to one of the contact holes 335 and 335', and each of the sense pads 330 corresponds to one of the contact holes 335 and 335'.

The plurality of sense pads 330 is formed on the insulating layer 320 where the plurality of contact holes 335 and 335' is formed. While the plurality of sense pads 330 is formed, a metallic material fills the plurality of contact holes 335 and 335', and each of the plurality of sense pads 330 may be electrically connected to corresponding sense wire 310 through the contact holes 335 and 335'.

Next, a layout of the lower substrate 100 will be described.

The display unit 200 is disposed on the lower substrate 100, and the plurality of MUX units 110 and 110' are disposed at lateral ends of the lower substrate 100 separate from the display unit 200. A buffer layer 210 may be provided between the lower substrate 100 and the display unit 200 to planarize the lower substrate 100 and to prevent permeation of impurities.

The display unit 200 may include a plurality of display elements. The plurality of display elements may be at least one of an organic light emitting diode (OLED) display, a liquid crystal display (LCD), a field emission display (FED), and a plasma display panel (PDP). The display unit 200 displays an image using the plurality of display elements. The display unit 200 may be formed corresponding to the size of a display area of the display device.

A printed circuit board PCB 130 configured to include various electrical parts provided for driving and control of the display unit 200 may be provided at one side of the display unit 200. A display driver IC (DDI) 150 for driving the display unit 200 may be provided between the printed circuit board PCB 130 and the display unit 200. The display driver IC 150 and the printed circuit board 130 may be connected through input and output wires 151. The display driver IC 150 may be connected to the display unit 200 through data lines 152.

A touch panel drive IC (TDI) 140 is provided in the printed circuit board 130 to drive and control the plurality of sense pads 330. The touch panel driver IC 140 is connected with the plurality of sense driving wires 141 and 141' and a plurality of sense control wires 146 and 146'. Although the exemplary embodiment illustrates that the touch panel driver IC 140 is provided in the printed circuit board 130, the present invention is not limited thereto. The touch panel driver IC 140 may be provided on the lower substrate 100 or included in the display driver IC 150 as necessary, including any other viable embodiment.

The MUX units 110 and 110' respectively include a plurality of second connection units 111 and 111'. The MUX units 110 and 110' are connected to the sense driving wires 141 and 141' and sense control wires 146 and 146', and are connected to the touch panel driver IC 140 through the sense driving wires 141 and 141' and the sense control wires 146 and 146'. A number of MUX units 110 and 110' may be twice the number of the sense pad groups, and a number of second connection units 111 and 111' included in each of the MUX units 110 may be half the number of sense pads 330 included in the corresponding sense pad group. For example, when m sense pad groups each with n sense pads 330 arranged in the first direction are arranged in the second direction, 2m MUX units 110 and 110' may be provided, and each of the MUX units 110 and 110' may include n/2 second connection units 111 and 111'. In other words, a total of n×m second connection units 111 and 111' may be provided on the respective sides of the lower substrate 100.

Hereinafter, a connection relationship between the upper substrate 300 and the lower substrate 100 will be described.

The upper substrate 300 and the lower substrate 100 are attached to each other, wherein one side of the upper substrate 300 where the plurality of sense pads 330 are disposed and one side of the lower substrate 100 where the display unit 200 may be disposed face each other. In this case, a sealant 250 may be used to attach the upper substrate 300 and the lower substrate 100 to each other. As the sealant 250, an organic sealant, an inorganic sealant, and an organic/inorganic complex sealant or a mixture thereof may be used.

The first connection units 311 and 311' disposed on the upper substrate 300 may be electrically connected to the plurality of second connection units 111 and 111' disposed on the lower substrate 100, respectively. For example, each of the n×m first connection units 311 and 311' disposed on the upper substrate 330 is connected to each of the n×m second connection units 111 and 111' disposed on the lower substrate 100. The plurality of first connection units 311 and 311' and the plurality of second connection units 111 and 111' may be electrically connected with each other by conductive members 120 and 120'. As the conductive members 120 and 120' may include various conductive materials such as a silver paste, an anisotropic conductive film (ACF), and the like. As the plurality of first connection units 311 and 311' and the plurality of second connection units 111 and 111' are electrically connected through the conductive members 120 and 120', the plurality of sense wires 310 may be electrically connected to the touch driver IC 140.

The touch panel driver IC 140 transmits a sense control signal to the MUX unit 100 through the sense control wires 146 and 146', and the MUX units 110 and 110' connect one of the plurality of second connection units 111 and 111' to the sense driving wire 141 according to the sense control signal. The second connection units 111 and 111' connected to the sense driving wires 141 and 141' are in turn connected to the first connection units 311 and 311' through the conductive members 120 and 120', and the corresponding first connection units 311 and 311' are connected to the sense wires 310 and 310'.

A default capacitance may be formed in the sense pads 330 and 330' connected to the sense wires 310 and 310', and the capacitance of the sense pads 330 may be changed when a contact occurs thereto by a finger and the like. When the sense driving wires 141 and 141' and the second connection units 111 and 111' are connected by the MUX units 110 and 110', the changed capacitance of the sense pad 330 is transmitted to the touch panel driver IC 140 through the sense wires 310 and 310', the first connection units 311 and 311, the second connection units 111 and 111', and the sense drive wires 141 and 141'. The touch panel driver IC 140 detects a touch location by checking the sense wires 310 and 310' to which the changed capacitance was transmitted.

When 2m MUX units 110 and 110' each include n/2 second connection units 111 and 111', the touch panel driver IC 140 sequentially transmits sense control signals to the n/2 MUX units 111 and 111', and each MUX units 110 and 110' may sequentially connect the n/2 second connection units 111 and 111' to the sense driving wires 141 and 141'. The touch panel driver IC 140 may measure each capacitance of the sense pad 333 transmitted when the second connection units 111 and 111' are sequentially connected to the sense driving wires 141 and 141' to detect a touch location.

When 2m MUX units 110 and 110 each include n/2 second connection units 111 and 111', the touch panel driver IC 140 sequentially transmits n/2 sense control signals to the 2m MUX units 110 and 110', where each sense control signal includes m sense control signals each to be simultaneously sent to corresponding MUX unit 110 and 110', respectively, and each MUX units 110 and 110' may sequentially connect the n/2 second connection units 111 and 111/simultaneously to the sense driving wires 141 and 141' corresponding to the respective n/2 sense control signals. The touch panel driver IC 140 may measure 2m capacitances of the sense pads 333 each transmitted from corresponding MUX unit 110 and 110', when the second connection units 111 and 111' are connected to the sense driving wires 141 and 141' corresponding to the sense control signal to detect a touch location.

Figure 7:
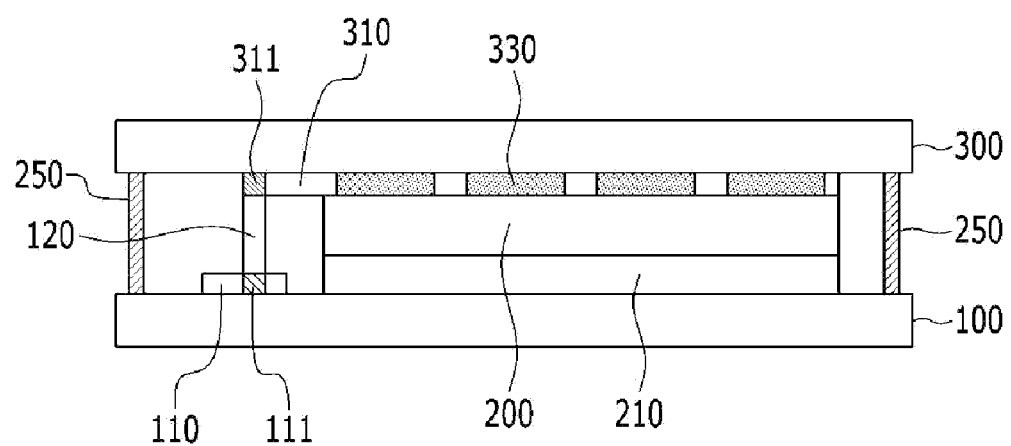
FIG. 7 is a schematic cross-sectional view of a display device according to an exemplary embodiment of the present invention.
Figure 8:
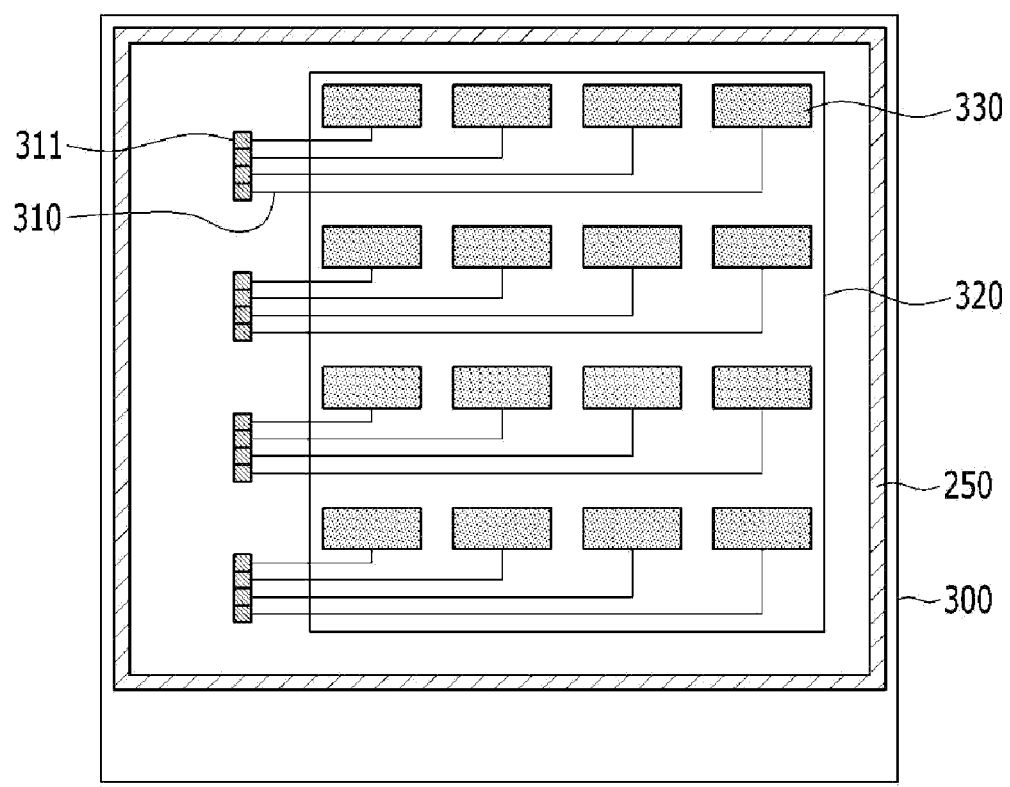
FIG. 8 is a top plan view illustrating one side of an upper substrate of the display device according to the other exemplary embodiment of the present invention illustrated in FIG. 7.
Figure 9:
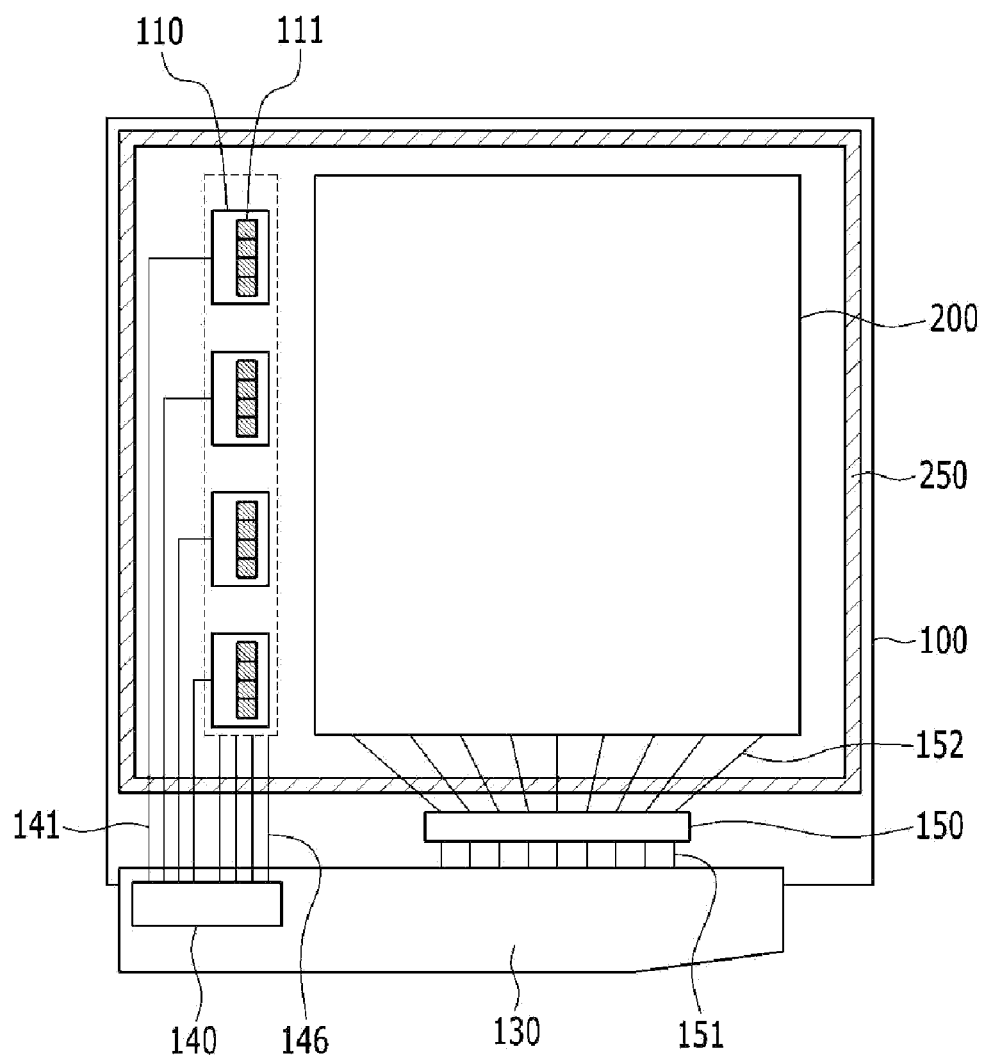
FIG. 9 is a top plan view illustrating one side of a lower substrate of the display device according to the other exemplary embodiment of the present invention illustrated in FIG. 7.

FIG. 7 is a schematic cross-sectional view of a display device according to another exemplary embodiment of the present invention. FIG. 8 is a top plan view of one side of an upper surface of the display device according to the other exemplary embodiment of the present invention illustrated in FIG. 7. FIG. 9 is a top plan view of one side of a lower substrate of the display device according to the other exemplary embodiment of the present invention illustrated in FIG. 7.

Referring to FIG. 7, FIG. 8, and FIG. 9, the display device includes a lower substrate 100 on which a display unit 200 and at least one MUX unit 110 are disposed, and an upper substrate 300 on which a plurality of sense pads 330 are disposed. The lower substrate 100 and the upper substrate 300 may be formed of similar materials to the exemplary embodiment illustrated in FIG. 1.

First, a layout of the upper substrate 300 will be described.

A plurality of sense pads 330 and a plurality of sense wires 310 are disposed on the upper substrate 300.

The plurality of sense pads 330 may be arranged in a matrix format. The plurality of sense pads 330 may be arranged in a first direction and a second direction that is perpendicular to the first direction. The plurality of sense pads 330 may be made of a metal mesh. The metal mesh may be formed by finely patterning a high-conductive metal. The plurality of sense pads 330 may be made of a transparent electrically conductive material such as indium tin oxide (ITO), indium zinc oxide (IZO), and the like.

The plurality of sense wires 310 are disposed at one side of the plurality of sense pads 330 on the upper substrate 300. Each sense wires 310 are connected to each sense pads 330 and extended in the first direction on the upper substrate 300. The number of sense wires 310 may be equivalent to the number of the sense pads 330. For example, a sense pad group may include n sense pads 330 arranged in the first direction, and n sense wires 310 may be formed under the n sense pads 330. When m sense pad groups, each sense pad groups including n sense pads 330 arranged in the first direction, are arranged in the second direction, n×m sense wires 310 may be formed. Each end of the n×m sense wires 310 may be connected to each of a plurality of first connection units 311 arranged on the upper substrate 330, respectively. That is, n×m first connection units 311 may be arranged on the upper substrate 330.

A layout of the lower substrate 100 is the same as the layout of the lower substrate 100 of FIG. 3 and a connection relationship between the upper substrate 300 and the lower substrate 100 is the same as shown in FIG. 1, FIG. 2, and FIG. 3.

According to the exemplary embodiments of the present invention, a touch panel function can be realized without additional attachment of a touch panel, and an increase of the number of wires required for the touch function in accordance with an increasing size of the display device can be prevented.

The detailed description of the accompanying drawings and the invention only relate to an embodiment of the present invention, and are used for the purpose of describing the present invention but are not used to limit the meanings or a range of the present invention described in the claims. Accordingly, those skilled in the art to which the invention pertains can easily understand that various modifications and equivalent embodiments may be possible. Therefore, a substantial technical protective range of the present invention will be determined based on a technical idea of the appended claims.

What is claimed is:

1. A display device, comprising:
an upper substrate;
a plurality of sense wires disposed on the upper substrate;
a plurality of sense pads disposed on the upper substrate;
a plurality of first connection units disposed on the upper substrate;
a lower substrate;
a display unit comprising a plurality of display elements, disposed on the lower substrate;
multiplexer (MUX) units disposed on the lower substrate;
a touch panel driver integrated circuit (IC) connected to the MUX units; and
conductive members electrically connecting the plurality of first connection units and the plurality of second connection units, respectively,
wherein each of the plurality of sense wires is connected with each of the plurality of sense pads, and one end of each of the plurality of sense wires is connected to each of the plurality of first connection units, respectively, and the MUX units each comprise a plurality of second connection units.

2. The display device of claim 1, wherein
the plurality of sense pads comprises a plurality of sense pad groups, each of the plurality of sense pad groups comprising sense pads arranged in a first direction and arranged in a second direction perpendicular to the first direction, and
a number of provided MUX units equals the number of sense pad groups.

3. The display device of claim 2, wherein the plurality of sense wires is provided corresponding to the number of sense pads, and the MUX units each comprise a number of second connection units corresponding to the number of sense pads comprised in one sense pad group.

4. The display device of claim 3, further comprising a plurality of sense driving wires and a plurality of sense control wires, wherein
the touch panel driver IC and the MUX units are connected with each other through the plurality of sense driving wires and the plurality of sense control wires, respectively, and
the touch panel driver IC is configured to transmit a sense control signal to the MUX units through the plurality of sense control wires, the MUX units are configured to connect the plurality of sense driving wires and one of the plurality of second connection units corresponding to the sense control signal, and the touch panel driver IC is configured to detect a touch location by measuring capacitance of the plurality of sense pads transmitted through the sense driving wires.

5. The display device of claim 4, further comprising a printed circuit board (PCB) configured to drive and control the display device.

6. The display device of claim 5, further comprising a display driver IC provided between the printed circuit board and the display unit, configured to drive the display unit.

7. The display device of claim 4, further comprising an insulating layer, wherein the plurality of sense pads are provided on the plurality of sense wires, and
the insulating layer is provided between the plurality of sense wires and the plurality of sense pads.

8. The display device of claim 7, wherein the insulating layer comprises a plurality of contact holes that correspond to the plurality of sense pads, and each of the plurality of sense pads is connected to each of the plurality of sense wires through the plurality of contact holes, respectively.

9. A touch panel device, comprising:
an upper substrate;
a plurality of sense wires disposed on the upper substrate;
a plurality of sense pads disposed on the upper substrate;
a plurality of first connection units disposed on the upper substrate;
a lower substrate;
multiplexer (MUX) units disposed on the lower substrate;
a touch panel driver integrated circuit (IC) connected to the MUX units; and
conductive members electrically connecting the plurality of first connection units and the plurality of second connection units,
wherein each of the plurality of sense wires is connected to each of the plurality of sense pads, and one end of each of the plurality of sense wires is connected to each of the plurality of first connection units, respectively, and
the MUX units each comprise a plurality of second connection units.

10. The touch panel device of claim 9, wherein
the plurality of sense pads comprises a plurality of sense pad groups, each of the plurality of sense pad groups comprising sense pads arranged in a first direction and arranged in a second direction perpendicular to the first direction, and
a number of provided MUX units equals the number of sense pad groups.

11. The touch panel device of claim 10, wherein the plurality of sense wires is provided corresponding to the number of sense pads, and the MUX units each comprise a number of second connection units corresponding to the number of sense pads comprised in a single sense pad group.

12. The touch panel device of claim 11, further comprising a plurality of sense driving wires and plurality of sense control wires, wherein
the touch panel driver IC and the MUX units are connected with each other through the plurality of sense driving wires and the plurality of sense control wires, respectively, and
the touch panel driver IC is configured to transmit a sense control signal to the MUX unit through the plurality of sense control wires, the MUX units are configured to connect the plurality of sense driving wires with one of the plurality of second connection units corresponding to the sense control signal, and the touch panel driver IC is configured to detect a touch location by measuring capacitance of the plurality of sense pads, transmitted through the sense driving wire.

13. The touch panel device of claim 12, further comprising an insulating layer, wherein the plurality of sense pads are provided on the plurality of sense wires, and
the insulating layer is provided between the plurality of sense wires and the plurality of sense pads.

14. The touch panel device of claim 13, wherein the insulating layer comprises a plurality of contact holes corresponding to the plurality of sense pads, and each of the plurality of sense pads is connected to each of the plurality of sense wires through the plurality of contact holes, respectively.

15. A method for driving a touch panel, comprising:
transmitting a sense control signal to a multiplexer (MUX) unit comprising a plurality of second connection units connected with a plurality of first connection units through conductive members;
connecting one of the plurality of second connection units to a sense driving wire connected to the MUX unit according to the sense control signal; and
detecting a touch location by measuring capacitance of a sense pad transmitted through the sense driving wire,
wherein the plurality of first connection units is connected to ends of a plurality of sense wires and the plurality of sense wires is connected to a plurality of sense pads.

16. The method for driving a touch panel of claim 15, wherein the plurality of sense pads comprises a plurality of sense pad groups, each of the plurality of sense pad groups comprising sense pads arranged in a first direction and arranged in a second direction perpendicular to the first direction, and a number of provided MUX unit equals the number of sense pad groups, and
the transmitting the sense control signal to the MUX unit further comprises sequentially transmitting the sense control signal to the plurality of MUX units.

17. The method for driving a touch panel of claim 16, wherein
the transmitting a sense control signal further comprises transmitting sense control signal that comprises multiple sense control signals each to be simultaneously sent to corresponding MUX unit, respectively, and
the connecting one of the plurality of second connection units to sense driving wires connected to the MUX units according to the sense control signal further comprises sequentially connecting the plurality of second connection units of each MUX unit simultaneously to the sense driving wires.

18. The method for driving a touch panel of claim 15, wherein the transmitting the sense control signal further comprises transmitting a number of sense signals corresponding to the number of second connection units to the MUX units.

19. A touch panel driver integrated circuit (IC) device, configured to detect a touch location, transmit a sense control signal to multiplexer (MUX) units comprising a plurality of second connection units connected to a plurality of sense pads, and configured to detect a touch location by measuring capacitance of a sense pad transmitted, when one of the plurality of second connection units is connected to the MUX units.

20. The touch panel driver IC device of claim 19, further configured to transmit sense control signal comprising multiple signals each to be simultaneously sent to corresponding MUX units, and further configured to detect a touch location by measuring capacitances of sense pads each transmitted from the corresponding MUX units.

* * * * *